May 17, 1966    R. M. GOODWIN ETAL    3,251,920
METHOD OF FORMING THERMOPLASTIC ARTICLES
Filed May 14, 1962

INVENTORS
Richard M. Goodwin,
Paul R. Malone, &
BY William E. Thompson
Peter P. Kozak,
ATTORNEY

United States Patent Office 3,251,920
Patented May 17, 1966

3,251,920
METHOD OF FORMING THERMOPLASTIC ARTICLES
Richard M. Goodwin, Paul R. Malone, and William E. Thompson, Anderson, Ind., assignors to General Motors Corporation, Detroit, Mich., a corporation of Delaware
Filed May 14, 1962, Ser. No. 194,603
2 Claims. (Cl. 264—291)

This invention relates to a method for forming a permanent curved section in an otherwise straight or linear thermoplastic article, such as a vinyl foam weatherstrip or the like.

In the co-pending United States patent application Serial No. 17,518, filed March 25, 1960, in the names of Lyle N. Williams et al., and assigned to the assignee of the present invention, there is disclosed a method for making weatherstripping suitable for use with automobile doors or the like which consists of an elongated vinyl chloride foam with an impervious vinyl chloride skin integrally formed therewith which is produced by slush molding vinyl plastisols.

It has been found that the vinyl foam weatherstrips referred to above cannot be made to efficiently conform to curved portions of the car bodies. Accordingly, it is an object of this invention to provide a method for forming a permanent curve in an elastomeric thermoplastic foam elongated bodies. It is a further object of this invention to provide a method for providing permanently formed curves of a predetermined configuration in foamed elastic thermoplastic weatherstrip, which involves the essential steps of stretching a section of the weatherstrip a predetermined amount and simultaneously applying sufficient heat to one side only of the strip to soften the said side and for a time sufficient to cause this portion of the strip to lose its elastic properties, then rapidly cooling the strip while the opposite unheated side of the strip is in tension whereby the permanent curve of a desired configuration is formed. Preferably, the heat is applied centrally of the section being stretched during the stretching procedure.

Other objects and advantages of the invention will be apparent from the following description thereof and the accompanying drawings in which.

As indicated above, this invention involves a process by which a permanent curve is formed in a thermoplastic foam weatherstrip or gasket material which has been molded in a linear mold so that its natural configuration is linear, and which consists of a strip having a foam core, and a water-impermeable resin skin or cover layer.

Figure 1:
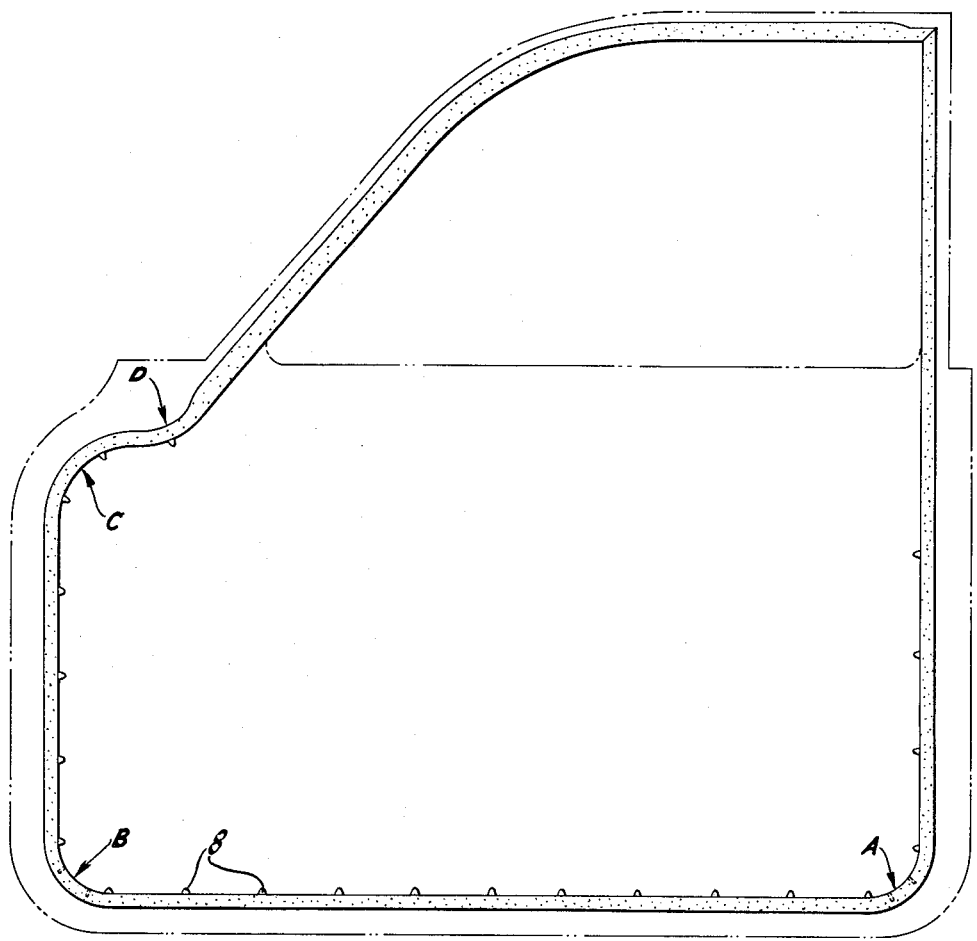
FIGURE 1 is an elevation view of a weatherstrip section associated with an automobile door shown in phantom.

As indicated in FIGURE 1, the construction of modern automobiles may require the use of a door (shown in phantom), which has a curved configuration at various points, such as A, B, C and D, and requires the use of a curved gasket or weatherstrip at these points. As disclosed in the aforementioned patent application Serial No. 17,518, and shown in FIGURE 2 satisfactory weatherstrips are formed consisting of a foamed polyvinyl chloride type foam core 2 and an integrally formed water-impervious skin or cover layer 4. Preferably, the base of the strip is provided with a heavy layer 6 for supporting the strip, and the base may be provided with integrally formed buttons 8 for attaching the strip to the car door. When such a weatherstrip has a heavy layer 6 for support it is particularly necessary that the method of this invention be applied if said heavy layer is to constitute the outside or convex surface of a curve since the normal tension needed in the strip to cause it to snugly engage the door will cause the strip to depart from the door in such curved areas. In FIGURE 1, point D indicates such a curve. The curves at points A, B, and C are formed with the heavy layer 6 at the inside or concave surface and in this particular application with the composite structure of this specific weatherstrip the use of the process of this invention is not required to securely attach the strip to the car door since the normal tension in the strip causes it to snugly engage such curved surfaces.

Figure 2:
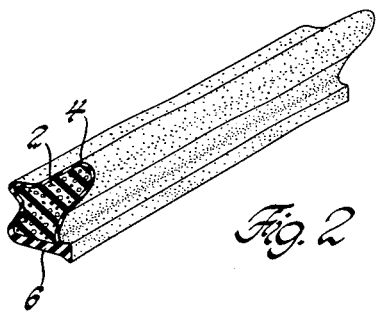
FIGURE 2 is a perspective view of the weatherstrip shown in FIGURE 1.

The invention involves clamping a weatherstrip at two spaced points at each side of the desired curved section, positioning a heating element midway between these two points over the sealing strip, subjecting the one side of the strip to heat at a sufficient temperature to soften the adjacent strip wall and cause it to lose its elasticity while simultaneously subjecting the strip to a predetermined pull or stretching action while maintaining the heating element essentially positioned midway between the points at which the weatherstrip is clamped, and then removing the heating element and cooling the weatherstrip as soon as the stretching operation has been concluded, whereby the side of the strip adjacent the heating element has been elongated while the opposite side has retained its original elasticity. Where the weatherstrip to be curved has a heavy base 6 as shown in FIGURE 2, the base side is preferably subjected to the heat-softening treatment.

While our invention has been described by means of certain specific examples, it is to be understood that its scope is not to be limited thereby except as defined in the following claims.

What is claimed is:

1. A method of forming a permanently curved section in an elongated elastomeric thermoplastic synthetic resin body, a foam core having a relatively thin impervious thermoplastic resin skin over the upper portions thereof and a relatively heavy base section of the same material comprising the steps of clamping off a section of said body at two spaced points thereof, moving a heating element adjacent the base only of said body midway between said points, gradually moving one of said points away from the other of said points to stretch said body while maintaining said heating element midway of said points, and continuing said heating and stretching for a time sufficient to cause a permanent elongation in said heated base side, and then cooling said heated base side.

2. A method of forming a permanently curved section in an elastomeric thermoplastic synthetic resin body, a foam core having a relatively thin impervious thermoplastic resin skin over the upper portions thereof and a relatively heavy base section of the same material comprising the steps of clamping said body at two spaced points thereof, heating the base only of said body to the softening temperature thereof midway between said points while stretching said body, continuing said heating and stretching for a time sufficient to cause a permanent elongation in said heated base side, and cooling said softened portion of said body.

References Cited by the Examiner

UNITED STATES PATENTS

| | | | |
|---|---|---|---|
| 2,502,772 | 4/1950 | Winstead | 264—288 XR |
| 2,767,435 | 10/1956 | Alles. | |
| 3,000,057 | 9/1961 | Swedlow et al. | 264—230 |
| 3,001,236 | 9/1961 | Maier et al. | |
| 3,019,475 | 2/1962 | Smith. | |
| 3,090,991 | 5/1963 | Hathaway. | |

ROBERT F. WHITE, *Primary Examiner.*

MORRIS LIEBMAN, *Examiner.*

M. R. DOWLING, *Assistant Examiner.*